(12) United States Patent
Spurlock et al.

(10) Patent No.: US 11,206,306 B2
(45) Date of Patent: Dec. 21, 2021

(54) ANALYTICS BASED CLOUD BROKERING OF DATA PROTECTION OPERATIONS SYSTEM AND METHOD

(71) Applicant: Cobalt Iron, Inc., Lawrence, KS (US)

(72) Inventors: Richard Raymond Spurlock, Lawrence, KS (US); Robert Merrill Marett, Lawrence, KS (US); Gregory John Tevis, Solvang, CA (US)

(73) Assignee: Cobalt Iron, Inc., Lawrence, KS (US)

(*) Notice: Subject to any disclaimer, the term of this patent is extended or adjusted under 35 U.S.C. 154(b) by 163 days.

(21) Appl. No.: 16/417,910

(22) Filed: May 21, 2019

(65) Prior Publication Data

US 2020/0374348 A1 Nov. 26, 2020

(51) Int. Cl.
*H04L 29/08* (2006.01)
*G06F 9/48* (2006.01)
*G06F 9/50* (2006.01)

(52) U.S. Cl.
CPC ........ *H04L 67/1097* (2013.01); *G06F 9/4806* (2013.01); *G06F 9/5088* (2013.01)

(58) Field of Classification Search
CPC ................. H04L 67/1097; H04L 67/06; H04L 29/08117; H04L 29/08639; H04L 67/148; H04L 43/08; H04L 67/10; H04L 29/08135; H04L 47/70; G06F 13/00; G06F 9/50; G06F 9/4806
See application file for complete search history.

(56) References Cited

U.S. PATENT DOCUMENTS

| 10,613,888 B1* | 4/2020 | Mentz ................. G06F 9/45558 |
| 2009/0235046 A1* | 9/2009 | Asano .................. G06F 3/0664 |
| | | 711/203 |

(Continued)

OTHER PUBLICATIONS

Wood, Timothy; XP-002634216; A Dissertation Outline entitled, Improving Data Center Resource Management, Deployment, and Availability With Virtualization; Graduate School of the University of Massachusetts Amherst; Computer Science; Jun. 2009; 58 pages.

(Continued)

*Primary Examiner* — Lesa M Kennedy
(74) *Attorney, Agent, or Firm* — Polsinelli PC; Kory D. Christensen

(57) ABSTRACT

A system includes a memory and at least one processor to monitor for a condition associated with a first cloud computing resource performing a cloud computing operation, determine that the condition associated with the first cloud computing resource has occurred, analyze the condition associated with the first cloud computing resource and compare the first cloud computing resource with a second cloud computing resource that is capable of performing at least a subset of the cloud computing operation, automatically modify the cloud computing operation that uses the first cloud computing resource to use the second cloud computing resource, and send at least one notification to a computing device about the condition associated with the first cloud computing resource and information associated with a modification of the cloud computing operation from the first cloud computing resource to the second cloud computing resource.

24 Claims, 8 Drawing Sheets

(56) References Cited

U.S. PATENT DOCUMENTS

| | | | |
|---|---|---|---|
| 2012/0179824 A1* | 7/2012 | Jackson | G06F 9/5072 709/226 |
| 2012/0297238 A1* | 11/2012 | Watson | G06F 11/3442 714/4.11 |
| 2014/0173089 A1* | 6/2014 | Li | H04L 41/18 709/224 |
| 2017/0078410 A1 | 3/2017 | Rao | |
| 2017/0177840 A1* | 6/2017 | Srivastava | G06F 9/5072 |
| 2017/0257429 A1* | 9/2017 | Hosie | H04L 67/1008 |
| 2018/0131629 A1 | 5/2018 | Pulier et al. | |
| 2018/0205759 A1* | 7/2018 | Hosie | H04L 67/10 |
| 2019/0042297 A1 | 2/2019 | Connor et al. | |
| 2019/0155511 A1* | 5/2019 | Tenner | G06F 3/0604 |
| 2019/0166007 A1* | 5/2019 | Sundaram | G06F 9/50 |
| 2019/0334757 A1* | 10/2019 | Hill | H04L 47/70 |
| 2020/0104161 A1* | 4/2020 | Kapur | G06F 11/2025 |
| 2020/0310889 A1* | 10/2020 | Levin | G06F 9/542 |

OTHER PUBLICATIONS

Extended European Search Report; EP App. No. 19190986.0; dated Nov. 2, 2020; 11 pages.

* cited by examiner

ANALYTICS BASED CLOUD BROKERING OF DATA PROTECTION OPERATIONS SYSTEM AND METHOD

BACKGROUND

Protection of data in a modern computing network is an amazingly complex and costly endeavor. Massive data growth limits the abilities of hardware and software technologies and also puzzles well-trained data professionals.

As enterprises continue to expand the usage of cloud services to run software applications and information technology (IT) infrastructure, many challenges associated with cloud computing are emerging. Cloud services are often naively considered to be nearly always available and fully resilient. However, this is incorrect. Many cloud services have availability that is worse than traditional, on-premise computing infrastructure. In addition, cloud service interruptions appear to becoming more common. Some cloud resource providers (e.g., providers of infrastructure, platform, or software services in the cloud) have been known to cut off or restrict services intentionally to users unexpectedly based on changes in user workloads or internal cloud resource provider issues (e.g., cloud service maintenance). In other examples, cloud resource providers may limit input/output operations per second (IOPS) for certain users and may modify cloud resource limits indiscriminately. As a result, users of cloud services may experience unexpected disruptions of cloud services.

Performance of cloud computing deployments also continues to suffer. For example, there are a number of significant challenges in leveraging cloud services for high data bandwidth applications such as backup and disaster recovery and other data protection operations. Further, contrary to common perception, financial costs of cloud computing services are unpredictable and can be exorbitant. The costs may be based on cloud computing resources that are not properly decommissioned after use, internal cloud networking costs, costs for accessing or moving data stored using cloud computing resources, and unmonitored usage of cloud services, among others. Even further, the financial costs of various cloud services may change often and unpredictably. As a result, a cost-effective cloud computing implementation may suddenly become overly costly. Given these issues and other challenges, managing cloud resources effectively and efficiently proves to be a daunting task.

Cloud computing providers offer little to no assistance with these challenges because often the correct solution may be to move at least some operations and/or data to another cloud computing provider or switching back to using on-premise computing solutions at a physical location. In addition, another solution may include a combination of competing cloud computing providers and/or on-premise computing solutions. Effectively managing and coordinating computing implementations, data storage, data protection, disaster recovery, and other computing operations across a multi-cloud, multi-domain environment is a difficult task for businesses and enterprises. It is even more challenging to optimize a solution to select a best and most cost-effective use of available on-premise computing devices and cloud computing resources.

It is with these issues in mind, among others, that various aspects of the disclosure were conceived.

SUMMARY

According to one aspect, an analytics-based cloud brokering system and method is provided for data protection operations and other computing operations. As an example, the system may include at least one server computing device that determines that an issue or condition has occurred with a cloud computing resource that may be performing at least one cloud computing operation. The at least one server computing device may analyze the condition and determine that another cloud computing resource is able to better perform the at least one cloud computing operation and move the at least one cloud computing operation to the other cloud computing resource. The at least one server computing device also may perform remediation of the at least one cloud computing operation to ensure that data is protected and backed up.

A system may include a memory and at least one processor to monitor for a condition associated with a first cloud computing resource performing a cloud computing operation, determine that the condition associated with the first cloud computing resource has occurred, analyze the condition associated with the first cloud computing resource and compare the first cloud computing resource with a second cloud computing resource that is capable of performing at least a subset of the cloud computing operation, automatically modify the cloud computing operation that uses the first cloud computing resource to use the second cloud computing resource, and send at least one notification to a computing device about the condition associated with the first cloud computing resource and information associated with a modification of the cloud computing operation from the first cloud computing resource to the second cloud computing resource.

According to another aspect, a method includes monitoring, by at least one processor, for a condition associated with a first cloud computing resource performing a cloud computing operation, determining, by the at least one processor, that the condition associated with the first cloud computing resource has occurred, analyzing, by the at least one processor, the condition associated with the first cloud computing resource and comparing the first cloud computing resource with a second cloud computing resource that is capable of performing at least a subset of the cloud computing operation, automatically modifying, by the at least one processor, the cloud computing operation that uses the first cloud computing resource to use the second cloud computing resource, and sending, by the at least one processor, at least one notification to a computing device about the condition associated with the first cloud computing resource and information associated with a modification of the cloud computing operation from the first cloud computing resource to the second cloud computing resource.

According to an additional aspect, a non-transitory computer-readable storage medium includes instructions stored thereon that, when executed by a computing device cause the computing device to perform operations, the operations including monitoring for a condition associated with a first cloud computing resource performing a cloud computing operation, determining that the condition associated with the first cloud computing resource has occurred, analyzing the condition associated with the first cloud computing resource and comparing the first cloud computing resource with a second cloud computing resource that is capable of performing at least a subset of the cloud computing operation, automatically modifying the cloud computing operation that uses the first cloud computing resource to use the second cloud computing resource, and sending at least one notification to a computing device about the condition associated with the first cloud computing resource and information associated with a modification of the cloud computing operation from the first cloud computing resource to the second cloud computing resource.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
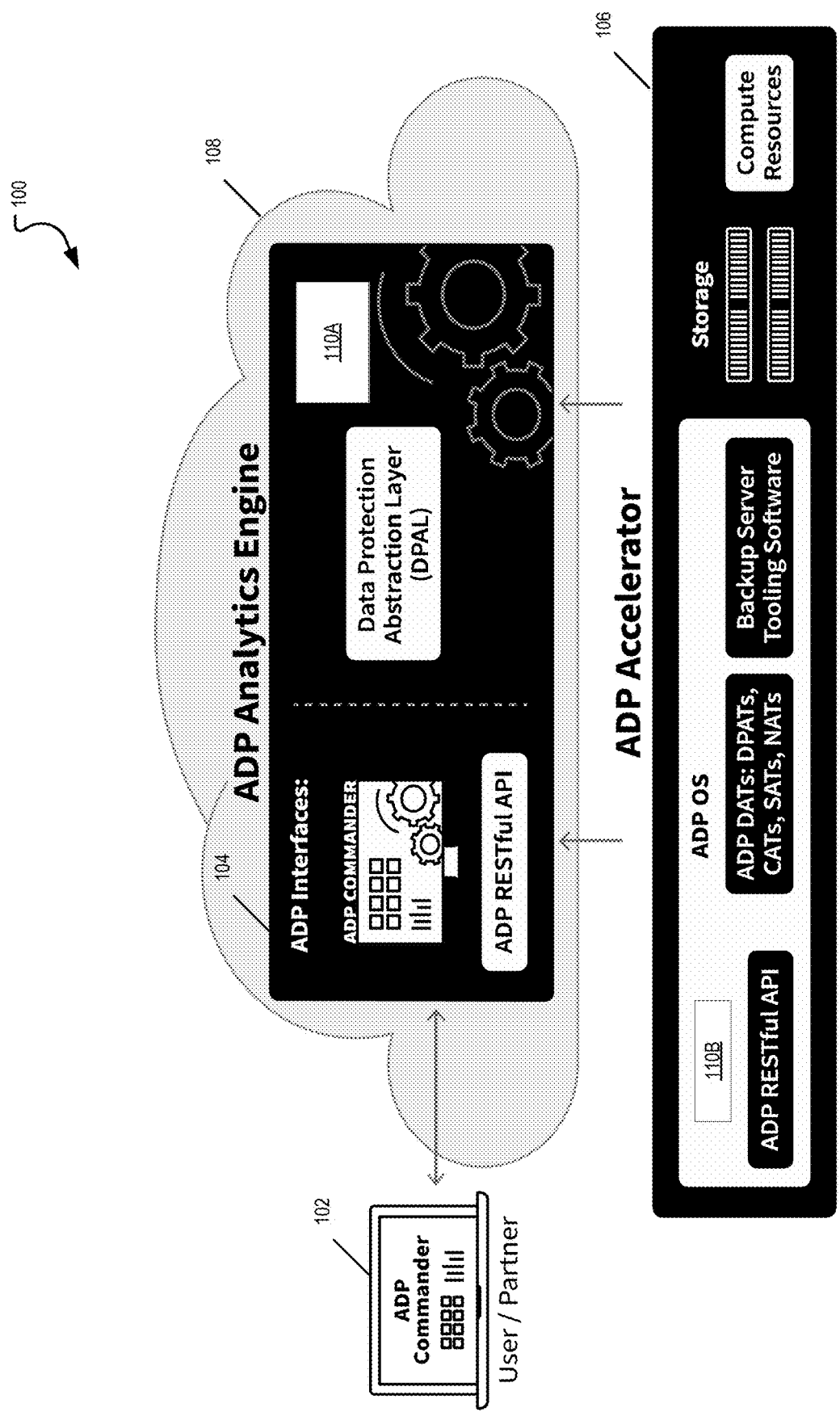
FIG. 1 is a block diagram of an analytics-based cloud brokering system according to an example embodiment.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

The client computing devices and the server computing devices may communicate over a communications network using Hypertext Transfer Protocol (HTTP) and/or other communications protocols. HTTP provides a request-response protocol in the client-server computing model. A client application running on the client computing device may be a client and a server application running on the server computing device may be the server, e.g., a web server. The client submits, for example, an HTTP request to the server. The web server of the server computing device provides resources, such as Hypertext Markup Language (HTML) files and/or other content, and performs other functions on behalf of the client, and returns an HTTP response message to the client. Other types of communications using different protocols may be used in other examples.

The one or more computing devices may communicate based on representational state transfer (REST) and/or Simple Object Access Protocol (SOAP). As an example, a first computer (e.g., a client computer) may send a request message that is a REST and/or a SOAP request formatted using Javascript Object Notation (JSON) and/or Extensible Markup Language (XML). In response to the request message, a second computer (e.g., a server computer) may transmit a REST and/or SOAP response formatted using JSON and/or XML.

Aspects of a system and method include automatically modifying, optimizing, and/or re-architecting cloud solutions across multi-cloud environments and hybrid cloud environments (e.g., an environment that includes one or more on-premise data centers or servers) in response to a variety of conditions or changes in the data protection or cloud environments. A new level of cloud service availability and performance awareness and remediation may be provided. In addition, the techniques discussed herein provide for brokering of cloud services to provide optimal data protection, disaster recovery, and other information technology (IT) operations and services across diverse domains of technology, including, but not limited to, on-premise and multi-cloud infrastructures.

In one example, the system may monitor for a condition associated with a first cloud computing resource performing a cloud computing operation, determine that the condition associated with the first cloud computing resource has occurred, analyze the condition associated with the first cloud computing resource and compare the first cloud computing resource with a second cloud computing resource that is capable of performing at least a subset of the cloud computing operation, automatically modify the cloud computing operation that uses the first cloud computing resource to use the second cloud computing resource, and send at least one notification to a computing device about the condition associated with the first cloud computing resource and information associated with a modification of the cloud computing operation from the first cloud computing resource to the second cloud computing resource.

There are limited techniques and solutions available to manage and broker data protection services and computing services and operations across cloud computing providers and environments. Cloud resource providers (e.g., providers of infrastructure, platform, or software services in the cloud) are best equipped to provide solutions to assist users and customers with effectively managing cloud computing solutions for applications such as data protection. However, cloud resource providers have minimal interest in solving these problems because the best solution for a given situation may include use of another cloud resource provider, or even no cloud resource provider. Conventional and existing techniques do not provide the ability to adjust or change cloud-based computing implementations in response to failures or changes in cloud computing environments (e.g., loss of cloud services, change in financial costs of cloud services, continued operational failures in a current cloud-based implementation, change in security alert levels). As discussed herein, a cloud computing resource or cloud resource may be any number of cloud services available from cloud resource providers. Cloud services include infrastructure services such as compute, network, or storage resources. Cloud services also may include platform services such as operating system software. Cloud services also may include software services such as business applications in the cloud. Cloud services may further include data ingress or data egress services for copying or moving data in, out, or across different cloud services and cloud resource providers. Cloud services may further include various other cloud services such as recovery in the cloud and backup of cloud workloads, among others.

A cloud computing resource implementation or cloud resource implementation may be a configuration of one or more on-premise or cloud computing resources including at least one cloud computing resource that may be used together to instantiate a particular application or process. As an example, a cloud data protection application may employ a cloud resource implementation that may utilize on-premise physical or virtual computing resources that may be configured together with a cloud resource to store data such as storage resources. As another example, a cloud data protection application may employ a cloud resource implementation that may execute on a compute cloud resource in one cloud computing region and that backs up data to a storage cloud resource in another cloud region or that backs up the data to a storage cloud resource provided by another cloud resource provider.

As another example, a cloud computing operation may be an operation that utilizes at least one cloud computing resource. For example, an application or process that leverages a compute cloud resource or other cloud computing resource may be considered to be a cloud computing operation. In addition, the execution of an individual computing task that uses at least one cloud resource may also be considered to be a cloud computing operation. Examples of a cloud computing task may include running a backup job using a cloud computing resource, performing a data replication task across a plurality of differing cloud computing resources, and backing-up on-premise data to a storage cloud resource.

As an example, a cloud resource authentication request may be a request by a user, a cloud computing operation, a cloud computing resource, or another entity to access or use at least one cloud resource. Operational metadata for computing operations that utilize cloud computing resources may include operation type, data transfer amounts, data service levels, data owner information, data security information, data retention time, data custody requirements such as data locality rules, and other data policy information or other metrics associated with the computing operation.

Operational behavior for computing operations that utilize cloud resources may include operation execution times, operation data transfer rates achieved, operation failure and success rates, cloud computing costs associated with computing operations, and other results of cloud computing operations.

Operational metadata and operational behavior information may be collected from multiple levels of the system and multiple sources including from computing systems, computing data policies, cloud policies, observation of computing operations both into and out of cloud networks, public facing cloud application programming interfaces (APIs), non-public cloud-integrated APIs, observed behaviors such as impacted performance, and other sources.

As discussed herein, a condition may be a change in at least one of usage of at least one cloud computing resource, availability of at least one cloud computing resource, performance of at least one cloud computing resource, capacity of at least one cloud computing resource, health of at least one cloud computing resource, financial costs of at least one cloud computing resource, a cloud service contract associated with at least one cloud computing resource, change in a security alert level of at least one cloud computing resource, and environmental metrics associated with at least one cloud computing resource.

Additionally, operational metadata and operational behavior of at least one cloud computing operation (e.g., a cloud data protection operation) that utilizes at least one cloud computing resource may be continually monitored for an operational condition that may trigger a modification to another cloud computing operation. The modification may include transitioning the at least one cloud computing operation from a first cloud computing provider or resource to a second cloud computing provider or resource. This may be a transition from an on-premise to an off-premise cloud computing resource or may be a transition from an off-premise cloud computing resource to an on-premise cloud computing resource.

Conditions may also include operational conditions. An operational condition may be a change in at least one of operational metadata and operational behavior of at least one cloud computing operation (e.g., a cloud data protection operation) that utilizes at least one cloud computing resource. In one example, an operational condition may occur when a change in a data service level requests a higher performance service level for particular data associated with a cloud computing operation. When this operational condition is detected, the ADP analytics server computing device 104 may analyze a new higher performance level requested for the data involved in the cloud computing operation, assess currently available cloud computing resources from at least one cloud computing service provider (including private on-premise cloud computing resources), determine an available cloud computing resource that best matches the higher performance service level, and modify a cloud computing resource implementation to utilize the best matched cloud computing resource for the cloud computing operation.

An operational condition may occur when a change in a data custody locality rule requests that particular data remain within particular governmental or geographical boundaries. When the operational condition is detected, the ADP analytics server computing device 104 may analyze the data custody locality rule, identify a best available cloud computing resource that is within the governmental or geographic boundaries as requested, and modify a cloud computing resource implementation to utilize the best available cloud computing resource for the cloud computing operation.

In another example, operational behavior for a computing operation that utilizes a cloud computing resource may be continually monitored. As an example, the operational behavior may include operation execution times, operation data transfer rates, operation failure rates, operation success rates, and cloud computing financial costs. An operational condition may occur when operation execution times are unacceptable and too lengthy, operation data transfer rates are below a particular threshold, a number of operation failures are above a threshold, or cloud computing financial costs are above a particular threshold. When the operational condition is determined, the system may analyze at least one available cloud computing resource from at least one cloud computing service provider including private on-premise cloud computing resources to determine a cloud computing resource that may best address the operational behavior issue. This may provide a shorter operation execution time, a faster operation data transfer rate, a lower number of operation failures, or a lower cloud computing financial cost, among other solutions. The system may modify a cloud computing resource implementation to utilize the selected cloud computing resource to address the operational behavior issue.

FIG. 1 shows a block diagram of a computing system that includes an analytics-based cloud brokering system 100 according to an example embodiment. The analytics based cloud brokering system 100 includes at least one client computing device 102 that is in communication with at least one Adaptive Data Protection (ADP) analytics engine server computing device 104 (hereinafter ADP analytics server computing device) and at least one ADP accelerator server computing device 106 via a communications network 108.

According to an exemplary embodiment, the analytics-based cloud brokering system 100 may include one logical instance of the ADP analytics server computing device 104, a plurality of client computing devices 102, and a plurality of ADP accelerator server computing devices 106, among other computing devices. Each entity, company, organization, corporation, etc. may have its own particular ADP accelerator server computing device 106 that communicates with the ADP analytics server computing device 104. Each ADP accelerator server computing device 106 may be implemented based on particular workloads, a computing architecture, a network architecture, and a cloud computing network deployment for that particular entity.

In one embodiment, the ADP analytics server computing device 104 may include a plurality of hardware and software modules that may perform various functions. The ADP analytics server computing device 104 may receive metadata exhaust from each ADP accelerator server computing device 106 of the system 100 and may push information and messages to the ADP accelerator server computing device 106 such as software upgrades, configuration instructions, policies, operational commands, security controls, etc. In addition, the ADP analytics server computing device 104 may store and process information associated with analytical intelligence, automation, and best practice capabilities within its modules that may optimize ADP accelerator operations.

The ADP analytics server computing device 104 may include a data protection abstraction layer (DPAL) that may interact with ADP data acquisition tools (DATs) and may handle data protection, cloud computing, storage, and network products and services, enabling the management of data protection, cloud computing, storage, and network products and services in a consistent manner in the system 100. The ADP analytics server computing device 104 may provide an ADP commander user interface and an ADP RESTful application programming interface (API). In an example embodiment, the ADP analytics server computing device 104 may provide capabilities and services that may be delivered as a service from at least one global cloud computing provider.

The ADP accelerator server computing device 106 may include compute resources (e.g., hardware servers, virtual servers (e.g., VMware virtual machines), and various cloud compute resources (e.g., virtual, bare metal, or hosted systems)). A bare metal virtualization may include running a virtual operating system using a hypervisor. A hosted system may run a virtual operating system using virtual hardware on a host operating system, which uses physical hardware. The compute resources may include memory (e.g., RAM and/or ROM), network interfaces, management interfaces, storage area network (SAN) interfaces, and other resources.

The ADP accelerator server computing device 106 may include an ADP operating system (ADP OS) that provides management, monitoring, reporting, alerting, control, integration, orchestration, ADP analytics exhaust management, and other modules and services that may monitor and control data protection operations that may be monitored by the ADP accelerator server computing device 106 for the system 100. The ADP OS may provide environmental monitoring including the measuring of temperature, power, and other variables associated with the system 100 and its associated network, cloud computing system, and other computing systems and environments.

The ADP OS may provide ADP data acquisition tools (ADP DATs). The ADP DATs may manage, monitor, and control a variety of data protection, cloud computing, storage, and network products and services. ADP DATs may include a data protection acquisition tool (DPAT), cloud acquisition tool (CAT), storage acquisition tool (SAT), and a network acquisition tool (NAT).

Further, the ADP OS may include and manage backup server tooling software. This may include a set of backup server tooling software products (e.g., IBM SPECTRUM PROTECT™, VERITAS NETBACKUP™, VEEAM, etc.), cloud backup services, server or storage snapshot utilities, application backup tools, or other backup or replication utilities that may execute many backup, restore, and long-term data retention operations on data in the system 100 and its associated network, cloud computing system, and other computing systems and environments. In addition to backup server tooling software, the ADP OS also may include and manage operating system software associated with computing devices in the system 100, file systems associated computing devices of the system 100, and other software resources associated with the system 100.

In short, the ADP OS may interact with the ADP analytics server computing device 104 to manage and automate data protection operations of the system 100.

Storage of the system 100 may include backups of system user data that may be stored where the user desires, e.g., on local storage computing devices and on cloud storage, among other locations. Storage may be physically included in the ADP accelerator server computing device 106 and/or may be separate such as external storage arrays and/or stored on cloud-based storage. However, the storage may appear to a user as being logically attached to the ADP accelerator server computing device 106 and may be used by ADP accelerator server computing device services.

According to an example embodiment, the ADP accelerator server computing device 106 may be deployed on client premises, in a data center, in a remote office, in a private cloud computing environment, in a public cloud computing environment, and in a third-party hosting/data center, among other locations. The ADP accelerator server computing device 106 may be deployed as a virtual appliance in a virtual environment (e.g., VMWARE® Cloud), as a physical appliance, or in a public cloud computing environment (on virtual, bare metal, or hosted systems). In order to provide greater degrees of data security and availability, the ADP accelerator server computing device 106 may be configured to create additional copies of data via services such as data replication and data copies to various media types or storage classes.

The ADP accelerator server computing device 106 may have associated data protection hardware and software infrastructure that may include the compute resources discussed above, the storage discussed above, network components, traffic patterns, firmware levels, microcode, data protection software tooling, cloud functionality, and others. In addition, the ADP accelerator server computing device 106 may be in communication via the communications network 108 with additional data protection infrastructure including other protected servers, storage devices, applications, data, backup servers, networks, deduplication appliances, cloud workloads, and others.

In one embodiment, the ADP accelerator server computing device 106 may be considered an ADP conduit. An ADP conduit may provide industry services such as ticketing, orchestration, service management, and other solutions. An ADP conduit may be deployed to implement special security access controls that may be requested for various customer environments.

The ADP accelerator server computing device 106 may operate autonomously from the ADP analytics server computing device 104 but also may be integrated with the ADP analytics server computing device 104. The ADP accelerator server computing device 106 may share metadata exhaust data with the ADP analytics server computing device 104 and may in return receive analytics-derived guidance in order to optimize data protection operations for the system 100. In addition, operating system software, ADP OS software, backup server tooling software, device firmware/microcode, and other software may be transmitted from the ADP analytics server computing device 104 to the ADP accelerator server computing device 106.

The system 100 may include adaptive data protection interfaces including a graphical user interface (GUI) and a RESTful API as discussed above. The system 100 provides ADP Commander, a GUI that comprises a dashboard portal that graphically provides information regarding the system 100. The ADP Commander may be presented from the perspective, view, and authentication permissions of each user of the system 100. In addition, an administrator of the system 100 may access the portal to view the status for each user/partner associated with the system 100. The administrator may resolve issues, execute ADP accelerator server computing device 106 deployments, and may view analytics regarding the system 100 or individual customer domains. Services and solutions of the analytics-based cloud brokering system 100 may be shared amongst, and delivered through, multiple partners (e.g., separate companies and organizations and sub-organizations of companies) to multiple sets of clients and customers. A partner of the system 100 may view a particular portion of the system environment from the perspective, view, and authentication permissions of the partner. A partner may view partner customer environments. End users of the system 100 may view a portion of the system 100 from the perspective, view, and authentication permissions of the user. A customer may view ADP accelerator server computing device information and computing devices that may be associated with the ADP accelerator server computing device 106.

The ADP Commander user interface may provide complete multi-tenancy functions/features at different levels (e.g., partners, users) and may provide comprehensive reporting, monitoring, control, security, chargeback, showback, provisioning of client computing devices, policy management, capacity management, management of system inventories, and others at all levels.

In addition, the RESTful API provides ADP functionality and all ADP functions may be accessed and managed using the RESTful API.

The ADP analytics server computing device 104 may have an ADP analytics director application 110A and the ADP accelerator server computing device 106 may have an ADP analytics manager application 110B that communicates with storage that may include at least one database that comprises a non-relational database and/or a relational database for storing condition information, cloud computing resource information, and cloud computing operation information among other data. As an example, the information may be stored in a relational database management system (RDBMS), an open source distributed database management system such as a Not only SQL (NoSQL) database management system, an in-memory database (IMDB) management system, or another appropriate database management system.

The client computing device 102 may include a display and an input device. The display is used to display visual components of the ADP analytics director application 110A, such as at a user interface, e.g., ADP Commander. In one example, the user interface may display a user interface of the ADP analytics director application 110A, and a representation of the requested resources received from the ADP analytics server computing device 104. The display can include a cathode-ray tube display, a liquid-crystal display, a light-emitting diode display, a touch screen display, and/or other displays. The input device is used to interact with the ADP analytics director application 110A or otherwise provide inputs to the client computing device 102 and may include a mouse, a keyboard, a trackpad, and/or the like. The input device may be included within the display if the display is a touch screen display. The input device allows a user of the client computing device 102 to manipulate the user interface of the ADP analytics director application 110A or otherwise provide inputs to be transmitted to the ADP analytics server computing device 104.

The at least one ADP analytics server computing device 104 is configured to receive data from and/or transmit data to the at least one client computing device 102 through the communications network 108. Although the at least one ADP analytics server computing device 104 is shown as a single server, it is contemplated that the at least one server computing device 104 may include multiple servers, for example, in a cloud computing configuration.

The one or more computing devices communicate and coordinate their actions by passing messages over the communications network 108. The communications network 108 can be one or more of the Internet, an intranet, a cellular communications network, a WiFi network, a packet network, or another wired and/or wireless communication network or a combination of any of the foregoing. As an example, the one or more computing devices communicate data in packets, messages, or other communications using a common protocol, e.g., Hypertext Transfer Protocol (HTTP) and/or Hypertext Transfer Protocol Secure (HTTPS). As an example, the analytics-based cloud brokering system 100 may be a cloud-based computer system or a distributed computer system that may include one or more cloud-based computer systems including AMAZON WEB SERVICES, VMWARE CLOUD, MICROSOFT AZURE, IBM CLOUD, GOOGLE CLOUD PLATFORM, ALIBABA CLOUD, and other cloud computing services.

The ADP analytics director application 110A may be a component of an application and/or service executable by the client computing device 102 and/or the ADP analytics server computing device 104 and/or the ADP accelerator server computing device 106. For example, the ADP analytics director application 110A may be a single unit of deployable executable code or a plurality of units of deployable executable code. According to one aspect, the ADP analytics director application 110A may be a web application, a native application, and/or a mobile application (e.g., an app) downloaded from a digital distribution application platform that allows users to browse and download applications developed with mobile software development kits (SDKs) including the App Store and GOOGLE PLAY®, among others. The ADP analytics director application 110A may be installed on the client computing device 102, which may have a WINDOWS operating system, APPLE MACOS operating system, a Linux operating system, the iOS operating system or an ANDROID™ operating system, among other operating systems. In an exemplary embodiment, the ADP analytics director application 110A may include a first client component executed by the client computing device 102 and a second server component executed by the at least one ADP analytics server computing device 104 and/or the ADP accelerator server computing device 106.

The system 100 provides monitoring and data collection. Optimization of data protection infrastructure and operations begins with comprehensive and ongoing discovery, data collection, and monitoring of all aspects of the data protection environment. The ADP DATs may perform ongoing health, capacity, and performance monitoring and data collection of all data protection, cloud, storage, and network products and services. The monitoring and data collection may include the gathering of capacity and performance metrics (e.g., utilization rates, storage capacities, data throughput rates, I/O rates, etc.) and current health status (e.g., offline, online, in-progress, failed, failing, etc.) of all components and aspects of the data protection environment. A variety of events within the environment (e.g., a failed storage or network device, a fire, a security breach, a backup job completion, a database failure, a power outage, a business audit, etc.) and events outside of but associated with the environment (e.g., weather events, government alerts, etc.) may also be monitored and assessed. Conditions of the components, operations, and entire data protection environment may include an assessment of events, metrics, and current health status of all components and aspects of the data protection environment. For example, storage utilization, data throughput rates, and other metrics being within acceptable ranges assessed along with a health status of all devices being online may constitute a normal operating condition for a storage array. As a further example, metrics on a data protection operation (e.g., number of backups running, number of failed backups, amount of data and files backed up daily per client computing device, deduplication rates, etc.) may be assessed as normal operating conditions for data protection operations. As another example, a dramatic increase in metrics such as amounts of data and files backed up daily for multiple users combined with a dramatic decrease in data deduplication rate metrics may change a security condition code to indicate a ransomware attack is underway.

In another example, deviations in normal operating behavior of backup server tooling software (e.g., increased numbers of backup failures, backup server warnings or failures, or backup client warnings or failures) may be detected by the ADP analytics server computing device 104, which may request additional information such as client and server error logs, backup server data logs, and other information to be gathered by the DPAT. This additional information may be available for deeper analysis of operations by the ADP analytics server computing device 104.

Cryptovirology or ransomware attacks may leverage cryptography to encrypt data to make it inaccessible without special keys from an attacker. The malicious data encryption may result in dramatic changes in backup deduplication rates, backup data traffic, daily backup change rates, a number of files backed up daily per client computing device, and other operational metrics. The ADP analytics server computing device 104 may detect such changes that may indicate a ransomware attack. In addition, business security alert systems, the United States Computer Emergency Readiness Team (US-CERT), or other ransomware attack monitors may issue security alerts or set security alert levels to indicate that a ransomware attack has occurred. The ADP analytics server computing device 104 may detect the ransomware alerts and indicators. When the ADP analytics server computing device 104 detects a ransomware attack, it may take automated actions to avert, minimize, and remediate associated damage.

In one example, the ADP analytics server computing device 104 may analyze all metrics to determine which systems, devices, directories, files, databases, or other data have possibly been infected. Audit reports may be sent automatically to authorized data administrators, business executives, users, and other authorized individuals. In addition, the ADP analytics server computing device 104 may restrict or remove access to infected data and systems and potentially other data and systems. This may isolate the ransomware threat.

In addition, when ransomware is detected, the ADP analytics server computing device 104 may determine affected data, initiate recovery of affected data from the backup server tooling software to an original location or to a safe location, and/or initiate data replication or increase the frequency of data replication of the latest backup versions of all affected data from the backup server tooling software to an off-site location to preserve the most current copies of affected data off-site and protect the data using airgap storage. This may allow critical business data to be automatically removed from the site of the security attack before information officers are even aware of the attack.

The ADP analytics server computing device 104 may optimize data protection infrastructure and operations using automated best practices. As an example, disk errors, failures, or warnings may be provided by a storage device and sent to the ADP analytics server computing device 104. In this case, the ADP analytics server computing device 104 may take automated actions based on best practices. As an example, the ADP analytics server computing device 104 may automatically extend retention periods for associated backup data and/or storage devices storing the associated backup data that may be suffering from the disk errors, storage device failures, or backup failures. As an example, the ADP analytics server computing device 104 may perform at least one of identifying data that might be affected by one of a warning and an error on a storage device, extending retention periods for backup data and backup media associated with the data that might be affected by the one of the warning and the error on the storage device, initiating backup of the data that might be affected by the one of the warning and the error on the storage device, and validating integrity of the data that might be affected by the one of the warning and the error on the storage device, among other operations.

The system 100 may utilize advanced monitoring of target storage repositories, analyze various conditions and events in the environment, and dynamically select target storage repositories, such as a cloud storage device for backup data based on current conditions. In one example, the ADP accelerator server computing device 106 may detect a target storage repository that may be experiencing high space utilization or may be experiencing errors on one or more of its devices and may instruct the backup server tooling software to bypass the target storage repository and use another target storage repository for a specific backup data operation. In another example, the ADP analytics server computing device 104 may detect that there is a high security alert condition in the environment, or may detect that there is an issued US-CERT alert event, or may detect that there is a current ransomware attack event, or may detect that there is severe weather, flood, or fire event in the locality of the target storage repository, or may detect some other condition or event requiring different target storage repository selection. The ADP accelerator server computing device 106 may instruct the backup server tooling software to direct backup data for current backup data operations to move to an offsite repository or a cloud target storage repository.

Additionally, if one of various events or conditions occurs in the environment, the ADP analytics server computing device 104 may automatically perform data health remediation actions to optimize data protection operations and data custody discipline. The ADP analytics server computing device 104 may automatically initiate one or more service calls as needed for devices or components that may have failed or may be in the process of failing.

When the ADP analytics server computing device 104 detects certain warnings or failures or device errors on a primary storage array, the ADP analytics server computing device 104 may perform automated steps to remediate the health of associated data and maintain data custody discipline. The ADP analytics server computing device 104 may determine the systems, databases, file systems, and applications that may have associated data on the failing array. The ADP analytics server computing device 104 may inform the backup server tooling software to initiate automated, out-of-schedule backups or make replicated off-site copies of the data associated with the systems, databases, file systems, and applications. This may allow the system to obtain the very latest versions of data and any data that may be exposed to potential loss may be automatically ingested by the system 100.

In another example, if ransomware is detected that affects data, the ADP analytics server computing device 104 may instruct the backup server tooling software to initiate data replication of the latest backup versions of all affected data from the backup server tooling software to an off-site location. In addition, the ADP analytics server computing device 104 may initiate recovery and validation of all affected data to a safe location. In addition, the ADP analytics server computing device 104 may perform various data health validation operations when backup failures are detected. The backup failures may be associated with other associated conditions or events (e.g., device errors on the systems experiencing backup failures). In another example, the ADP analytics server computing device 104 may initiate restoration and validation of portions of data from previous backups that may be failing.

In addition, the system 100 may optimize data protection operation sequencing based on data custody discipline using a data custody policy. The data custody policy may include specification of General Data Protection Regulation (GDPR) data custody level (e.g., data controller, data processor) and other governing compliance requirements, business priority of data, data retention requirements, data security requirements (e.g., encryption levels, who has access to data), data resiliency requirements (e.g., data may have a replicated off-site location or a copy in another cloud region different from a current location), data locality specifications (e.g., where data may reside or not reside), a level of allowed network throughput, and other data custody disciplines. The ADP analytics server computing device 104 may use the data custody policy, data service level policy, business project priorities, and other input to prioritize automated data protection operations. In one example, if a backup fails, it may only be reinitiated based on the data custody policy. A backup retry, a data replication, or an automated data validation of a backup may be allowed based on the data custody policy.

In another example, daily backup processing and daily replication operations may be prioritized based on the data custody policy, a data service level policy, business project priorities, or others. As a result, the data backup or data replication operations may be tiered based on data priority.

Figure 2:
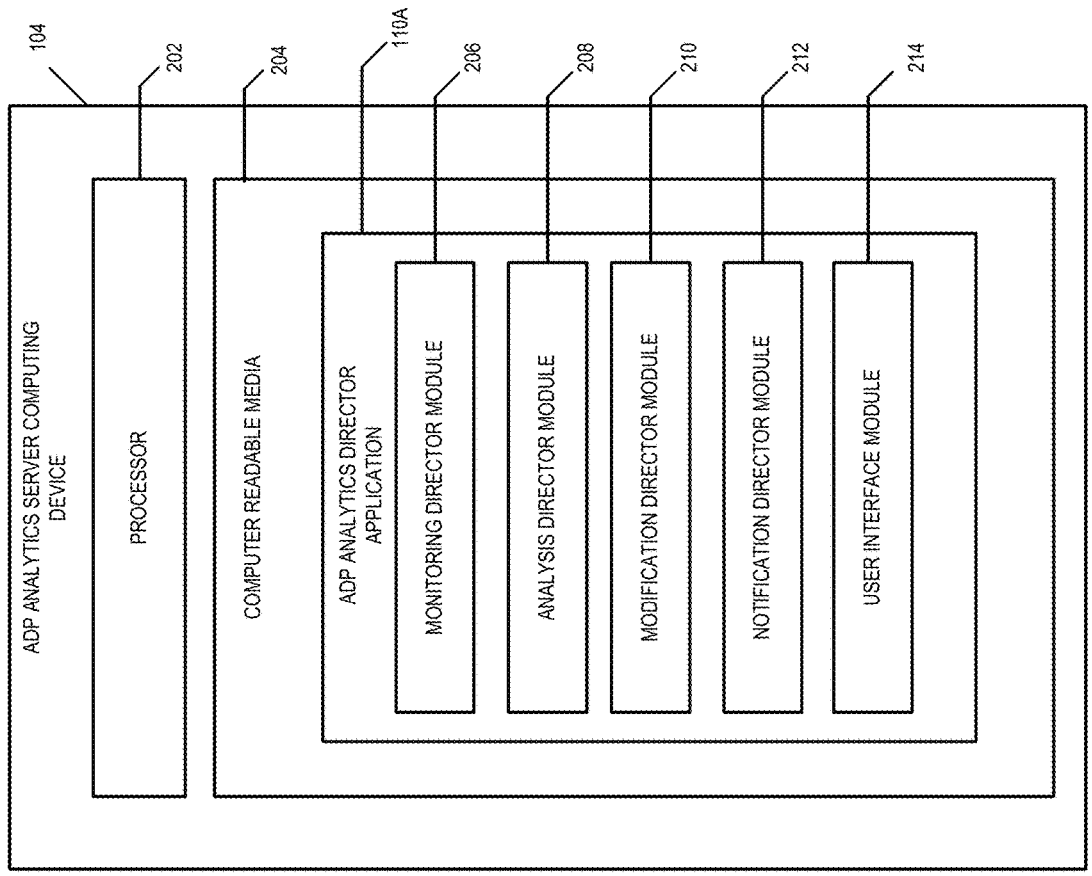
FIG. 2 illustrates a block diagram of a server computing device of the system according to an example embodiment.

FIG. 2 illustrates a block diagram of the ADP analytics server computing device 104 according to an example embodiment. The ADP analytics server computing device 104 may be a computer having a processor 202 and memory, such as a laptop, desktop, tablet computer, mobile computing device (e.g., a smartphone), or a dedicated electronic device having a processor and memory. The one or more processors 202 process machine/computer-readable executable instructions and data, and the memory stores machine/computer-readable executable instructions and data including one or more applications, including the ADP analytics director application 110A. The processor 202 and memory are hardware. The memory includes random access memory (RAM) and non-transitory memory, e.g., a non-transitory computer-readable storage medium such as one or more flash storages or hard drives. The non-transitory memory may include any tangible computer-readable medium including, for example, magnetic and/or optical disks, flash drives, and the like. Additionally, the memory may also include a dedicated file server having one or more dedicated processors, random access memory (RAM), a Redundant Array of Inexpensive/Independent Disks (RAID) hard drive configuration, and an Ethernet interface or other communication interface, among other components.

The ADP analytics server computing device 104 uses the ADP analytics director application 110A to transmit data, messages, and/or resources to the one or more client computing devices 102 and receive messages, data, and/or resources from the one or more client computing devices 102.

In order to obtain access to protected resources associated with the ADP analytics server computing device 104, e.g., data stored on protected computing devices or resources stored in the storage of the ADP accelerator server computing device 106, the client computing device 102 optionally may transmit a request or other communication, such as with a representation of a username and a password, to the ADP analytics server computing device 104 using lightweight directory access protocol (LDAP), HTTP, hypertext transport protocol secure (HTTPS) and/or other protocols. The request may be a LDAP request, a representational state transfer (REST) request, a Simple Object Access Protocol (SOAP) request, or another type of request. The ADP analytics server computing device 104 optionally verifies the username and password and transmits a response or other communication to the client computing device 102 or otherwise grants access to the client computing device to create and view data. The ADP analytics server computing device 104 may transmit an HTTP response, an HTTPS response, a LDAP response, a REST response, a SOAP response, and/or another type of response.

The username and password may be encrypted by the client computing device 102 using transport layer security (TLS), secure sockets layer (SSL), and/or other encryption protocols. The username and password may be encrypted using a cryptographic hash function (e.g., SHA-1, MD5, and others) to determine a hash-based message authentication code (HMAC) (hash-based message authentication code). In one example, "username.password" is encrypted using the cryptographic hash function. This cryptographic hash function allows the username and password to be verified and authenticated by the ADP analytics server computing device 104 without directly sending the username and password to the ADP analytics server computing device 104 via the communications network 108.

The ADP analytics server computing device 104 includes computer readable media (CRM) 204 in memory on which the ADP analytics director application 110A or other user interface or application is stored. The computer readable media may include volatile media, nonvolatile media, removable media, non-removable media, and/or another available medium that can be accessed by the processor 202. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The ADP analytics director application 110A includes the following modules. The modules may include sub-modules that may be associated with the ADP accelerator server computing device 106 and thus portions of the ADP analytics director application 110A may be executed by the ADP accelerator server computing device 106. The ADP analytics director application 110A may include a monitoring director module 206, an analysis director module 208, a modification director module 210, a notification director module 212, and a user interface module 214, among others.

The monitoring director module 206 may continually monitor and analyze at least one of metrics and conditions in the system 100. Metrics for each cloud resource may be monitored and tracked in particular time intervals (e.g., by hour, by day, by week, by month, by a different particular interval of time). Cloud computing resource metrics that may be monitored and tracked may include usage, availability, performance, data ingress, data egress, cloud resource health indicators, and current financial costs for use of a cloud resource, among others. Usage may be related to an amount of time a cloud computing resource may be used during a particular time interval. Availability may be related to an amount or percentage of time the cloud computing resource was available during the time interval. Performance may be related to input/output operations per second (TOPS) achieved when writing and/or reading to the cloud computing resource during the particular time interval. Data ingress may be related to an amount of data written to the cloud computing resource during the particular time interval. Data egress may be related to an amount of data read from the cloud computing resource during the particular time interval. Cloud resource health indicators may include information associated with severe weather warnings, cyber-attack alerts, cloud resource provider notifications, and others. The time intervals used for tracking metrics may be associated with time intervals used by cloud resource providers, e.g., a monthly payment or billing cycle for cloud resource provider A.

In addition, each cloud resource provider may have an associated cloud policy. The cloud policy may be maintained by the system 100 and may be used to specify cloud features and functions (e.g., cloud resources) that may be permitted for use by a user or business for data protection, disaster recovery, or other computing operations. The cloud policy may include a cloud resource provider name, a list of cloud computing resources available for the cloud resource provider, a list of names and descriptions for each cloud computing resources available for the cloud resource provider, an indication of whether each cloud computing resource is applicable for use by users, applications, or computing operations, total aggregate metrics for each cloud computing resource based on historical usage for computing operations including a total amount of time a cloud resource has been used, ongoing total aggregate percentage of time the cloud computing resource has been available, a total aggregate indication of performance for the cloud computing resource over a particular time (e.g., an average number of IOPS achieved writing to or reading from the cloud computing resource), a total aggregate amount of data ingress or data egress associated with the cloud computing resource, cloud resource health indicators, cloud service contract information, and financial information and costs associated with usage of the cloud computing resource, among others.

Cloud resource metrics may be continually monitored for a condition that may trigger modification to a cloud computing resource implementation, a cloud computing operation, or a cloud resource authentication request. A condition may be a change in at least one of usage, availability, performance, capacity, health, financial costs, a cloud service contract, a security alert level, and environmental metrics associated with at least one cloud computing resource.

The analysis director module 208 of the ADP analytics server computing device 104 may determine that a condition associated with a cloud computing resource has occurred and may analyze at least one of the condition, a cloud computing operation, and at least one available cloud computing resource and determine if steps may be taken to remediate the condition. As an example, a cloud policy for a cloud computing resource may be modified and changed for the cloud computing operation using the modification director module 210 responsive to the condition. This modification and change to the cloud policy for the cloud computing resource may specify whether a user or business is permitted to use the cloud computing resource for a data protection operation, disaster recovery operation, or other computing operation. Total aggregate usage metrics for a cloud computing resource may be continually monitored. A condition may occur for a particular user, application, or cloud computing operation. As an example, a cloud computing resource may exceed a particular threshold set by a user or by a cloud resource provider imposed limit on usage for the particular cloud computing resource within a particular time period. When the condition is detected and verified, the modification director module 210 may dynamically adjust an associated cloud policy to decline cloud resource authentication requests for the cloud computing resource, application, or computing operations until a next time period, e.g., next month. At a beginning of each time period for each cloud computing resource (e.g., a month), a cloud policy may be modified to permit cloud computing resource authentication requests for the cloud computing resource.

In another example, current financial costs for use of a cloud computing resource may be continually monitored based on data available from cloud computing providers and contract renewal notifications, among other sources. If a cloud computing service provider increases a financial cost for a cloud computing resource, this may trigger a condition. When the condition is detected, the modification director module 210 may dynamically adjust a cloud policy to decline cloud computing resource authentication requests for the cloud computing resource from users, applications, and cloud computing operations. When a condition occurs that may modify a cloud policy to change whether a cloud computing resource may be used, it may trigger a modification to a cloud computing resource implementation, a cloud computing operation, or a cloud computing resource authentication request.

As an example, if a compute resource or a storage resource is declined use by a cloud policy, the modification director module 210 may dynamically modify a cloud computing resource implementation to instead leverage and use another compute or storage cloud computing resource in another region, with another cloud computing service provider, or a private on-premise computing resource. As another example, if a cloud computing resource may not be suitable for use based on a cloud policy, the modification director module 210 may dynamically modify a data protection operation or another cloud computing operation to utilize another cloud computing resource provided by another cloud computing service provider or a private on-premise computing resource such as a private cloud computing resource. In addition, if the use of the cloud computing resource is no longer allowed by the cloud policy, the modification director module 210 may decline a specific cloud resource authentication request from a user, an application, a cloud computing operation, or another entity.

In a further example, the modification director module 210 may determine that a condition associated with the cloud computing resource has occurred and may initiate a cloud computing operation to remediate the condition associated with the cloud computing resource.

As another example, a condition may occur based on a change in an availability metric associated with at least one cloud computing resource. The availability of the cloud computing resource may have fallen below an acceptable threshold. As another example, an environmental metric associated with a cloud computing resource may have changed that indicates that the cloud computing resource is unavailable for a particular time period. As an example, a notification from a cloud computing provider may indicate that there is a period of time that the cloud computing resource will be unavailable due to maintenance. As another example, a cloud resource health indicator may change. The cloud computing resources in a particular geographic region may be exposed to an outage due to severe weather and/or utility interruptions. The region may have suffered severe weather and this may be detected based on severe weather warning notifications or other alerts. As another example, a condition may occur based on indications that the cloud computing resource may be subject to a cyber-attack as indicated by a cloud computing provider notification or by a change in a security alert monitor. The conditions associated with the at least one cloud computing resource may be detected by the analysis director module 208, which may initiate a cloud computing operation to remediate the condition associated with the at least one cloud computing resource. The analysis director module 208 may detect at least one condition and the modification director module 210 may initiate an immediate backup, replication, migration, or other cloud computing operation of any data associated with the at least one cloud computing resource to another cloud computing resource in a private on-premise location, another cloud computing region associated with the cloud computing resource, or a cloud computing resource provided by a different cloud computing provider. In other words, the cloud computing operation may be automatically initiated to remediate the condition associated with the at least one cloud computing resource.

The analysis director module 208 may determine that a condition or an operational condition associated with a cloud computing resource has occurred and may trigger a modification to a cloud computing operation by the modification director module 210. A condition may be, for example, a change in a performance metric associated with at least one cloud computing resource that indicates that the at least one cloud computing resource is not able to provide performance that meets a particular threshold to service a cloud computing operation. As noted above, an operational condition may be a change in a data service level that indicates that a cloud computing operation is to be performed faster.

As another example, an operational condition may be a change in an operation execution time for an operation that utilizes a cloud computing resource. The operation may have to be optimized. As another example, the operational condition may be a change in a data custody requirement that is associated with storing an additional copy of data associated with a cloud computing operation in a certain locality. The analysis director module 208 may detect that one of these conditions occurs and may analyze how to remediate the condition, may analyze how to optimize a cloud computing operation, and may split the cloud computing operation into one or more portions or subsets. As an example, the modification director module 210 may divide the cloud computing operation amongst one or more cloud computing resources including a different cloud computing resource in a same cloud computing region, a cloud computing resource in another cloud computing region, a cloud computing resource from private on-premise cloud computing resources, or a cloud computing resource provided by another cloud computing provider.

The notification director module 212 may send a notification, message, and/or alert to a computing device such as the client computing device 102. The notification may include information associated with the condition and a modification made to the cloud computing resource implementation, a cloud computing operation, or a cloud computing resource operation request.

The ADP analytics director application 110A includes a user interface module 214. The user interface module 214 receives requests or other communications from the client computing devices 102 and transmits a representation of requested information, user interface elements, and other data and communications to the client computing device 102 for display. As an example, the user interface module 214 generates a native and/or web-based graphical user interface (GUI) that accepts input and provides output by generating content that is transmitted via the communications network 108 and viewed by a user of the client computing device 102. The GUI may be the ADP Commander discussed herein. The user interface module 214 may provide realtime, automatically, and dynamically refreshed information to the user of the client computing device 102 using Java, Javascript, AJAX (Asynchronous Javascript and XML), ASP.NET, Microsoft .NET, and/or node.js, among others. The user interface module 214 may send data to other modules of the ADP analytics director application 110A of the ADP analytics server computing device 104 and retrieve data from other modules of the ADP analytics director application 110A of the ADP analytics server computing device 104 asynchronously without interfering with the display and behavior of the ADP analytics director application 110A displayed by the client computing device 102. As an example, data may be retrieved using XMLHttpRequest objects or using WebSockets.

Figure 3:
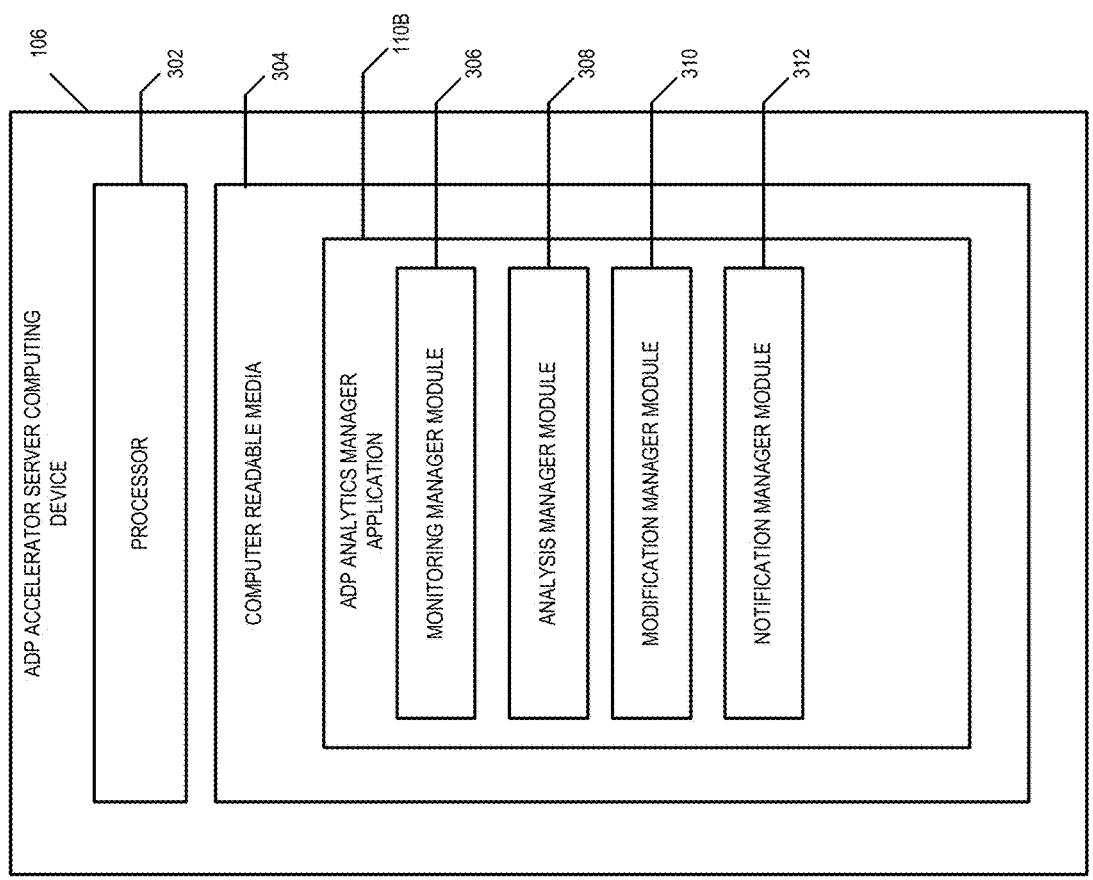
FIG. 3 illustrates a block diagram of another server computing device of the system according to an example embodiment.

FIG. 3 illustrates a block diagram of the ADP accelerator server computing device 106 according to an example embodiment. The ADP accelerator server computing device 106 may be a computer having a processor 302 and memory, such as a laptop, desktop, tablet computer, mobile computing device (e.g., a smartphone), or a dedicated electronic device having a processor and memory. The one or more processors 302 process machine/computer-readable executable instructions and data, and the memory stores machine/computer-readable executable instructions and data including one or more applications, including the ADP analytics manager application 110B. The processor 302 and memory are hardware. The memory includes random access memory (RAM) and non-transitory memory, e.g., a non-transitory computer-readable storage medium such as one or more flash storages or hard drives. The non-transitory memory may include any tangible computer-readable medium including, for example, magnetic and/or optical disks, flash drives, and the like. Additionally, the memory may also include a dedicated file server having one or more dedicated processors, random access memory (RAM), a Redundant Array of Inexpensive/Independent Disks (RAID) hard drive configuration, and an Ethernet interface or other communication interface, among other components.

The ADP accelerator server computing device 106 includes computer readable media (CRM) 304 in memory on which the ADP analytics manager application 110B or other user interface or application is stored. The computer readable media may include volatile media, nonvolatile media, removable media, non-removable media, and/or another available medium that can be accessed by the processor 302. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The ADP analytics manager application 110B may include a monitoring manager module 306, an analysis manager module 308, a modification manager module 310, and a notification manager module 312. The monitoring manager module 306 may work in conjunction with the monitoring director module 206 as discussed above. The analysis manager module 308 may work in conjunction with the analysis director module 208 as discussed above. The modification manager module 310 may work in conjunction with the modification director module 210 discussed above. The notification manager module 312 may work in conjunction with the notification director module 212 discussed above.

As an example, the monitoring manager module 306 may send information associated with one or more cloud computing resources connected to and in communication with the ADP accelerator server computing device 106 to the monitoring director module 206. This information may include monitoring information associated with the one or more cloud computing resources.

The analysis manager module 308 may send analysis information associated with the one or more cloud computing resources connected to and in communication with the ADP accelerator server computing device 106 to the analysis director module 208.

The modification manager 310 may work together with the modification director 210 to make any changes and modifications to the one or more cloud computing resources and the one or more cloud computing operations based on the analysis information.

The notification manager module 312 may assist the notification director module 212 in sending notifications associated with the one or more cloud computing resources connected to and in communication with the ADP accelerator server computing device 106 to the client computing device 102.

Figure 4:
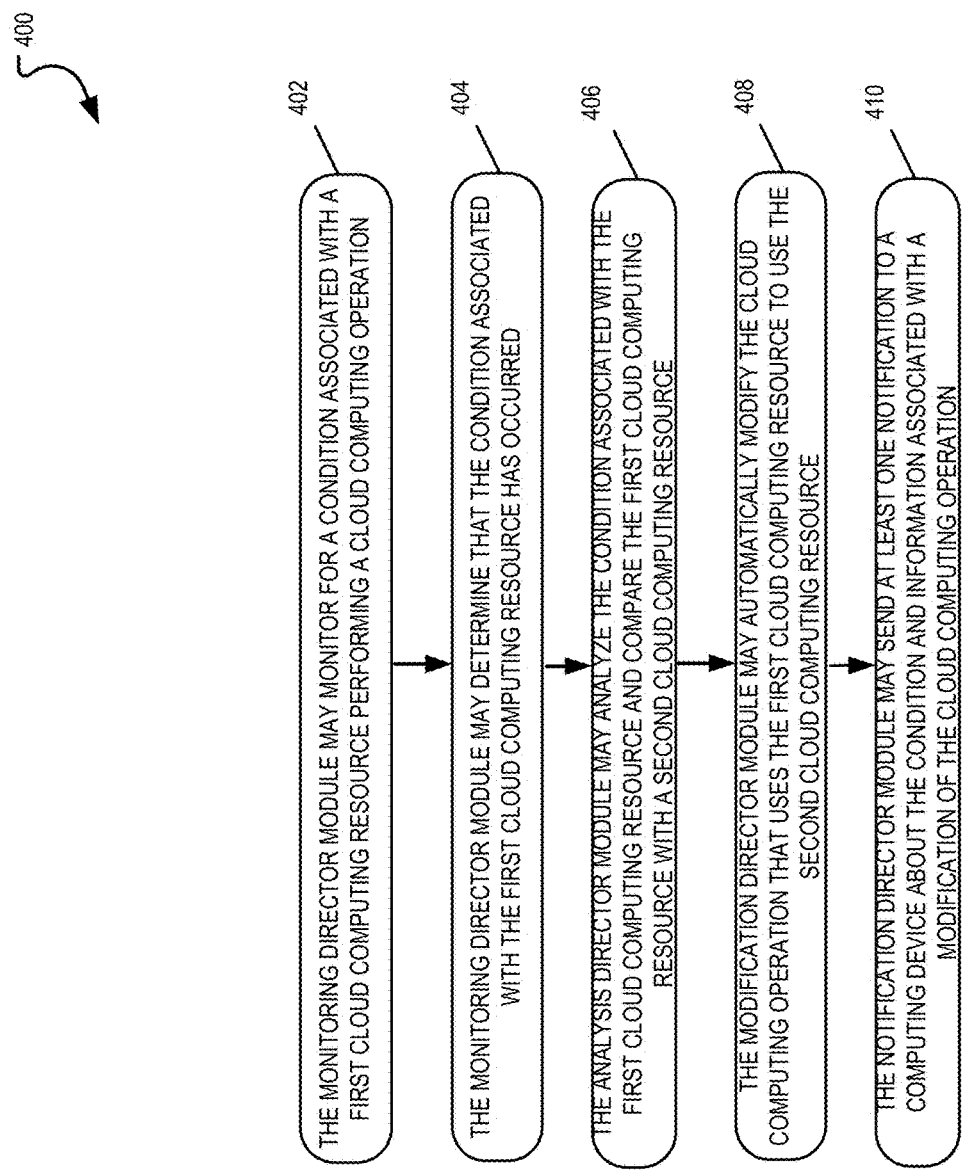
FIG. 4 illustrates a flowchart of a process for monitoring for a condition associated with a cloud computing resource according to an example embodiment.

FIG. 4 illustrates a flowchart of a process 400 for monitoring for a condition associated with a cloud computing resource according to an example embodiment. In a first step 402, the monitoring director module 206 of the ADP analytics server computing device 104 may continually monitor for a condition associated with a first cloud computing resource performing a cloud computing operation. The first cloud computing resource may be one of compute resources, network resources, storage resources, an operating system, application software, data ingress services, and data egress services, among others. In addition, the cloud computing operation may be one of a data protection operation, a data backup operation, data replication, and backup of on-premise data, among others.

Next, in step 404, the monitoring director module 206 may determine that the condition associated with the first cloud computing resource has occurred. The condition may be associated with one of usage of the first cloud computing resource during a particular period of time, availability of the first cloud computing resource during the particular period of time, performance of the first cloud computing resource during the particular period of time, data ingress for the first cloud computing resource during the particular period of time, data egress for the first cloud computing resource during the particular period of time, a cyber-attack on the first cloud computing resource during the particular period of time, cloud resource health indication information for the first cloud computing resource during the particular period of time, and financial information for the first cloud computing resource during the particular period of time, among others. The condition may be determined to have occurred by comparing the first cloud computing resource with a cloud policy as discussed above.

In step 406, the analysis director module 208 of the ADP analytics server computing device 104 may analyze the condition associated with the first cloud computing resource and compare the first cloud computing resource with a second cloud computing resource capable of performing at least a subset of the cloud computing operation.

In step 408, the modification director module 210 of the ADP analytics server computing device 104 may automatically modify the cloud computing operation that uses the first cloud computing resource to use the second cloud computing resource. Additionally, the modification director module 210 of the ADP analytics server computing device 104 may remediate the condition and initiate at least one of an immediate backup of data, replication of data, and migration of data and grant permission for a cloud resource authentication request for the second cloud computing resource. The second cloud computing resource may be one of an on-premise cloud computing resource and an off-premise cloud computing resource. Other options are possible. The second cloud computing resource may have at least one of a shorter operation execution time for the cloud computing operation than the first cloud computing resource, a faster data operation transfer rate for the cloud computing operation than the first cloud computing resource, a lower operation failure rate for the cloud computing operation than the first cloud computing resource, and a lower financial cost for the cloud computing operation than the first cloud computing resource, among other benefits and improvements.

In step 410, the notification director module 212 of the ADP analytics server computing device 104 may send at least one notification to a computing device such as the client computing device 102 about the condition and information associated with a modification of the cloud computing operation from the first cloud computing resource to the second cloud computing resource.

Figure 5:
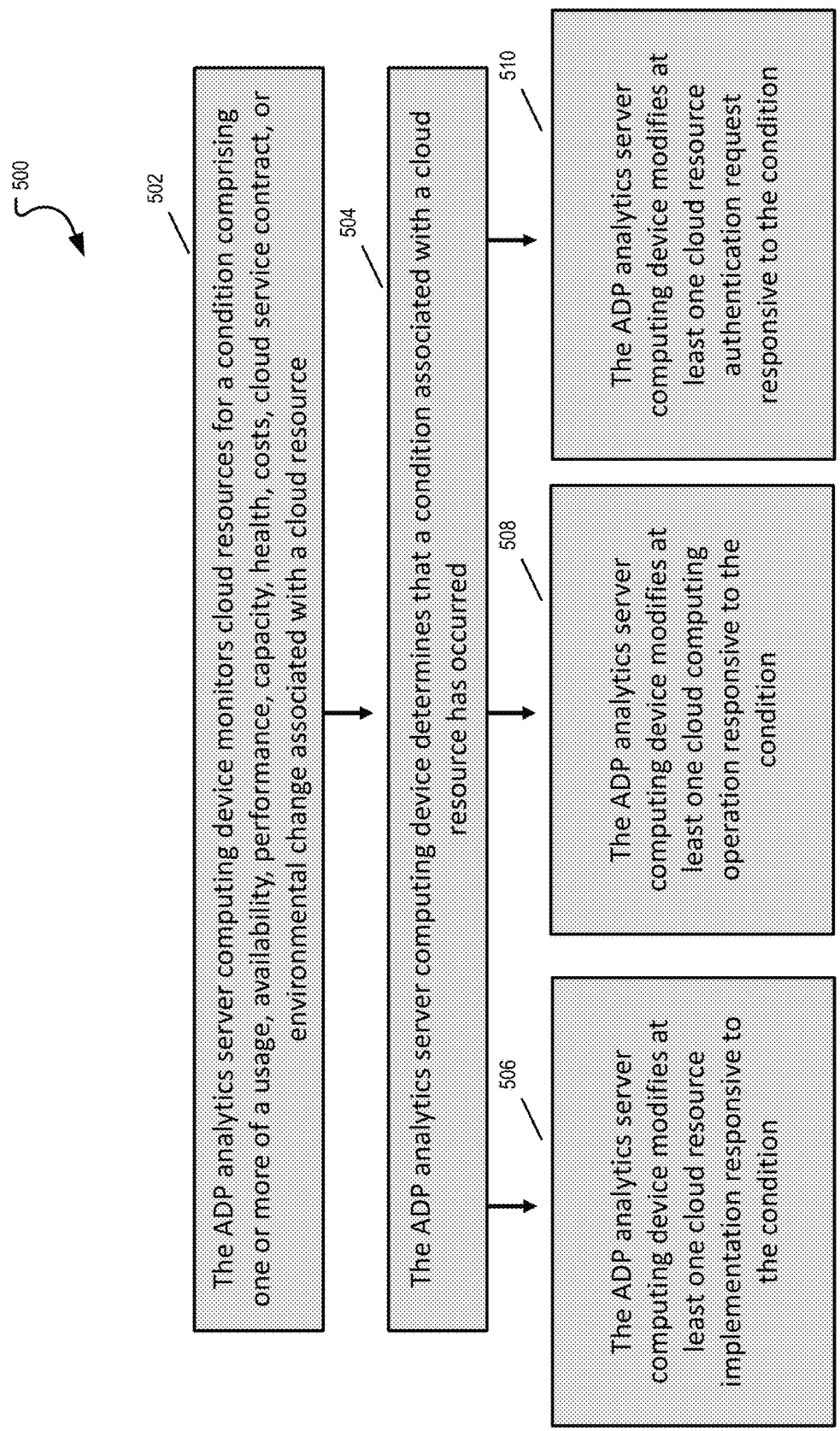
FIG. 5 illustrates another flowchart of a process for monitoring for a condition associated with a cloud computing resource according to an example embodiment.

FIG. 5 illustrates a flowchart of a process 500 for determining that a condition associated with a cloud computing resource has occurred according to an example embodiment. In a first step 502, the ADP analytics server computing device 104 monitors cloud computing resources for a condition comprising one or more of usage, availability, performance, capacity, health, financial cost, a cloud service contract issue, or an environment change associated with a cloud computing resource. Next, in step 504, the ADP analytics server computing device 104 determines that a condition has occurred with a cloud computing resource. In 506, the ADP analytics server computing device 104 may modify a cloud computing resource implementation responsive to the condition. In 508, the ADP analytics server computing device 104 may modify at least one cloud computing operation responsive to the condition. In 510, the ADP analytics server computing device 104 may modify at least one cloud resource authentication request responsive to the condition.

Figure 6:
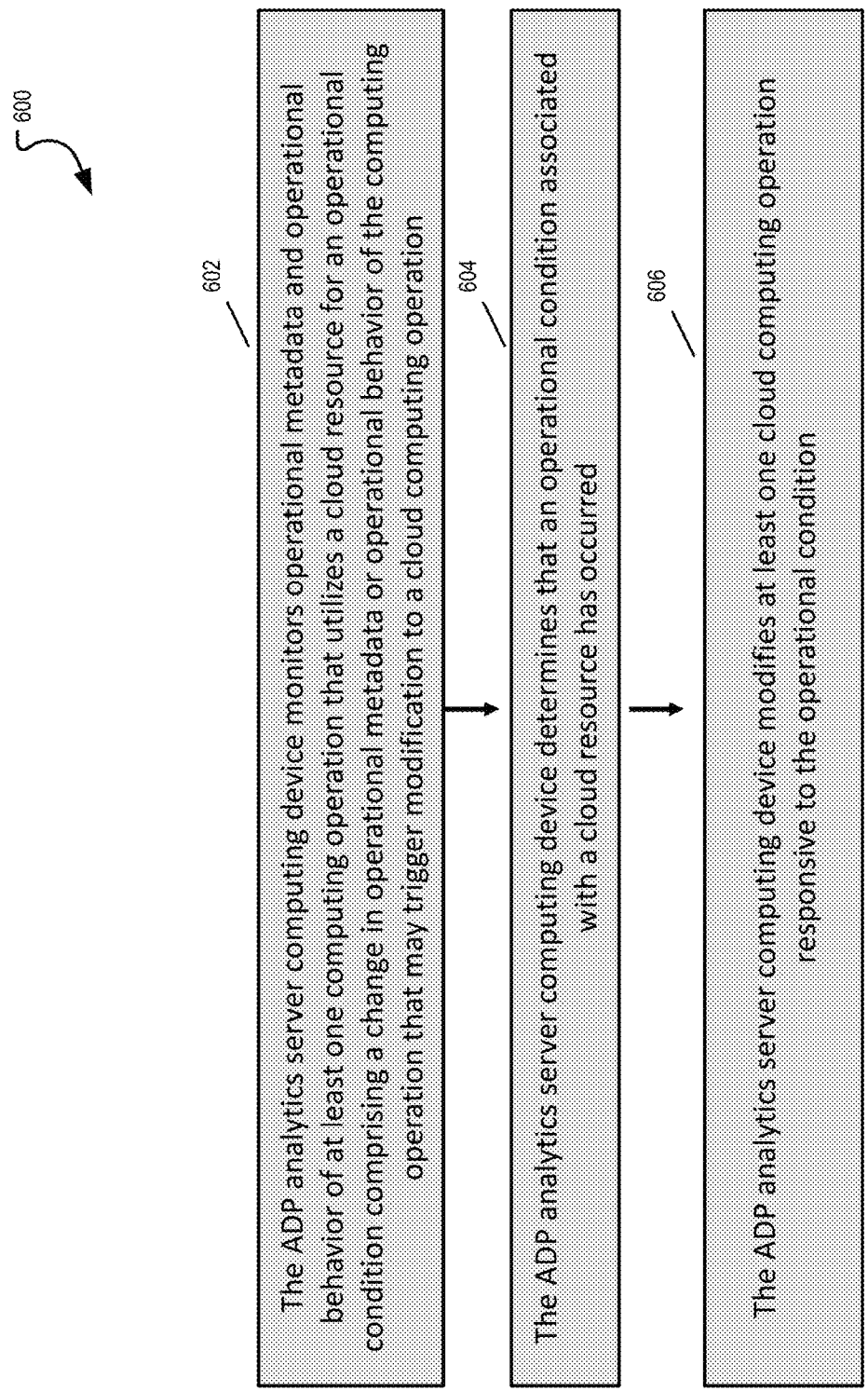
FIG. 6 illustrates another flowchart of a process for monitoring for a condition associated with a cloud computing resource according to an example embodiment.

FIG. 6 illustrates a flowchart of a process 600 for determining that a condition associated with a cloud computing resource has occurred according to an example embodiment. In a first step 602, the ADP analytics server computing device 104 may monitor operational data and operational behavior of at least one cloud computing operation that utilizes a cloud computing resource for a condition including an operational condition. The operational condition may be a change in operational metadata or operational behavior of the cloud computing operation that may trigger a modification to the cloud computing operation. In a second step 604, the ADP analytics server computing device 104 may determine that an operational condition associated with a cloud computing resource has occurred. In step 606, the ADP analytics server computing device 104 may modify at least one cloud computing operation responsive to the operational condition.

Figure 7:
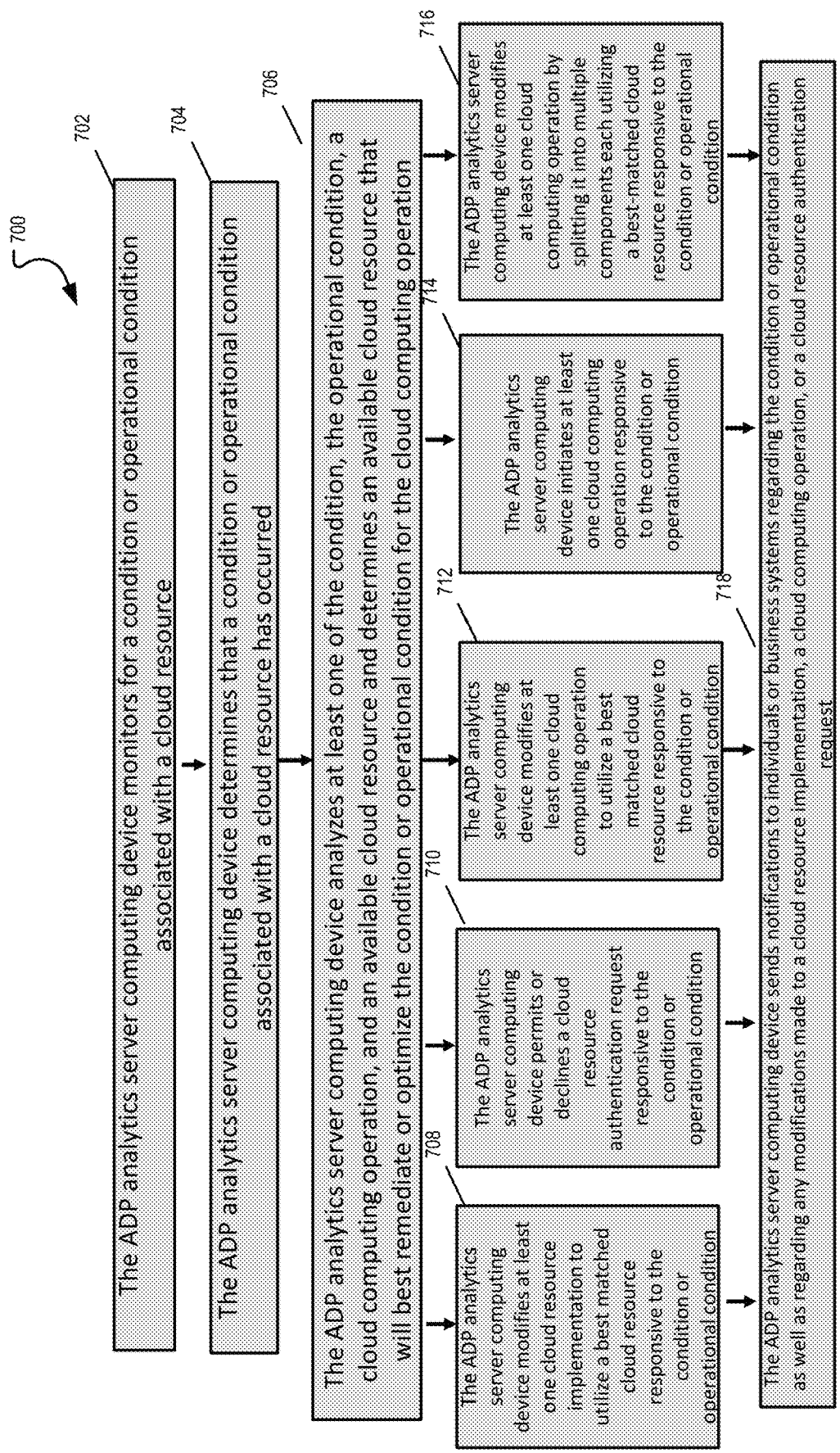
FIG. 7 illustrates another flowchart of a process for monitoring for a condition associated with a cloud computing resource according to an example embodiment.

FIG. 7 illustrates a flowchart of a process 700 for monitoring for a condition or operational condition associated with a cloud computing resource according to an example embodiment. In a first step 702, the ADP analytics server computing device 104 may monitor for a condition or an operational condition associated with a cloud computing resource. In a second step 704, the ADP analytics server computing device 104 may determine that the condition or the operational condition has occurred. In step 706, the ADP analytics server computing device 104 may analyze the condition or the operational condition. In addition, the ADP analytics server computing device 104 may analyze the cloud computing operation and the cloud computing resource. The ADP analytics server computing device 104 may also analyze one or more available cloud computing resources that are capable of performing at least some of the cloud computing operation. The ADP analytics server computing device 104 may determine or select at least one cloud computing resource to best remediate or optimize the condition or operational condition for the cloud computing operation.

In step 708, the ADP analytics server computing device 104 may modify at least one cloud computing resource implementation to select a best matched cloud computing resource responsive to the condition or the operational condition. In step 710, the ADP analytics server computing device 104 may permit or decline a cloud resource authentication request responsive to the condition or operational condition. In step 712, the ADP analytics server computing device 104 may modify at least one cloud computing operation to utilize a best matched cloud computing resource responsive to the condition or operational condition. In step 714, the ADP analytics server computing device 104 may initiate at least one cloud computing operation responsive to the condition or operational condition. In step 716, the ADP analytics server computing device 104 may modify at least one cloud computing operation by dividing or splitting the at least one cloud computing operation into multiple components, subsets, or units and assigning each of the components, subsets, or units to at least one particular substitute and best matched cloud computing component. In step 718, the ADP analytics server computing device 104 may send at least one notification to a client computing device, a user, or other recipient regarding the condition or operational condition. The notification also may include information related to modifications made to a cloud resource implementation, a cloud computing operation, or a cloud resource authentication request.

Figure 8:
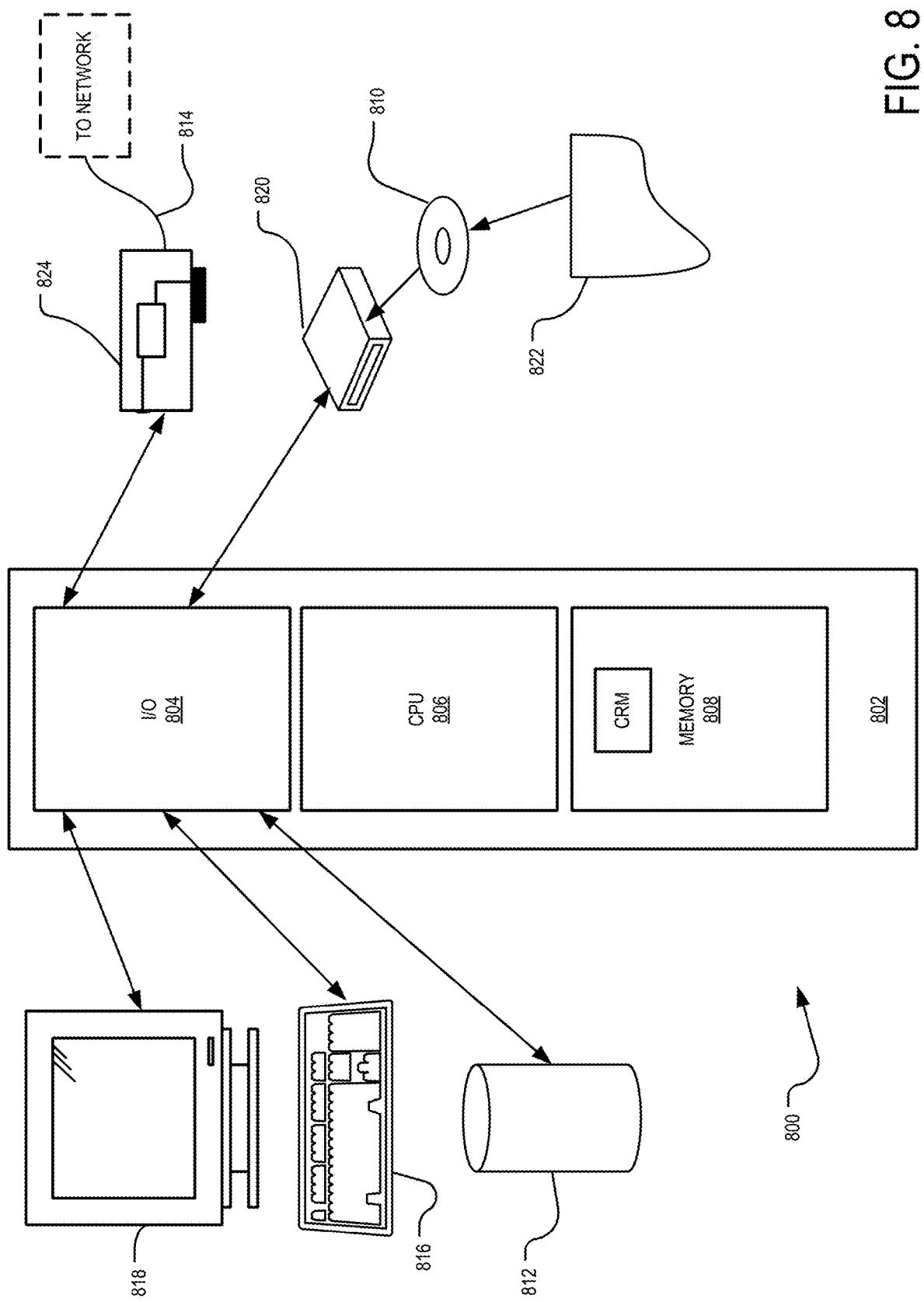
FIG. 8 illustrates a block diagram of an example computer device for use with the example embodiments.

FIG. 8 illustrates an example computing system 800 that may implement various systems, such as the client computing device 102, the ADP analytics server computing device 104, the ADP accelerator server computing device 106, and the methods discussed herein, such as process 400, process 500, process 600, and process 700. A general-purpose computer system 800 is capable of executing a computer program product to execute a computer process. Data and program files may be input to the computer system 800, which reads the files and executes the programs therein such as the ADP analytics director application 110A and the ADP analytics manager application 110B. Some of the elements of a general-purpose computer system 800 are shown in FIG. 8 wherein a processor 802 is shown having an input/output (I/O) section 804, a central processing unit (CPU) 806, and a memory section 808. There may be one or more processors 802, such that the processor 802 of the computer system 800 comprises a single central-processing unit 806, or a plurality of processing units, commonly referred to as a parallel processing environment. The computer system 800 may be a conventional computer, a server, a distributed computer, or any other type of computer, such as one or more external computers made available via a cloud computing architecture. The presently described technology is optionally implemented in software devices loaded in memory 808, stored on a configured DVD/CD-ROM 810 or storage unit 812, and/or communicated via a wired or wireless network link 814, thereby transforming the computer system 800 in FIG. 8 to a special purpose machine for implementing the described operations.

The memory section 808 may be volatile media, nonvolatile media, removable media, non-removable media, and/or other media or mediums that can be accessed by a general purpose or special purpose computing device. For example, the memory section 808 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 804 is connected to one or more user-interface devices (e.g., a keyboard 816 and a display unit 818), a disc storage unit 812, and a disc drive unit 820. Generally, the disc drive unit 820 is a DVD/CD-ROM drive unit capable of reading the DVD/CD-ROM medium 810, which typically contains programs and data 822. Computer program products containing mechanisms to effectuate the systems and methods in accordance with the presently described technology may reside in the memory section 808, on a disc storage unit 812, on the DVD/CD-ROM medium 810 of the computer system 800, or on external storage devices made available via a cloud computing architecture with such computer program products, including one or more database management products, web server products, application server products, and/or other additional software components. Alternatively, a disc drive unit 820 may be replaced or supplemented by a floppy drive unit, a tape drive unit, or other storage medium drive unit. The network adapter 824 is capable of connecting the computer system 800 to a network via the network link 814, through which the computer system can receive instructions and data. Examples of such systems include personal computers, Intel or PowerPC-based computing systems, AMD-based computing systems, ARM-based computing systems, and other systems running a WINDOWS-based, a UNIX-based, a LINUX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 800 is connected (by wired connection and/or wirelessly) to a local network through the network interface or adapter 824, which is one type of communications device. When used in a WAN-networking environment, the computer system 800 typically includes a modem, a network adapter, or any other type of communications device for establishing communications over the wide area network. In a networked environment, program modules depicted relative to the computer system 800 or portions thereof, may be stored in a remote memory storage device. It is appreciated that the network connections shown are examples of communications devices for and other means of establishing a communications link between the computers may be used.

In an example implementation, source code executed by the client computing device 102, the ADP analytics server computing device 104, the ADP accelerator server computing device 106, a plurality of internal and external databases, source databases, and/or cached data on servers are stored in the storage of ADP accelerator, memory of the client computing device 102, memory of the ADP analytics server computing device 104, memory of ADP accelerator server computing device 106, or other storage systems, such as the disk storage unit 812 or the DVD/CD-ROM medium 810, and/or other external storage devices made available and accessible via a network architecture. The source code executed by the client computing device 102, the ADP analytics server computing device 104, and the ADP accelerator server computing device 106 may be embodied by instructions stored on such storage systems and executed by the processor 802.

Some or all of the operations described herein may be performed by the processor 802, which is hardware. Further, local computing systems, remote data sources and/or services, and other associated logic represent firmware, hardware, and/or software configured to control operations of the analytics based cloud brokering system 100 and/or other components. Such services may be implemented using a general-purpose computer and specialized software (such as a server executing service software), a special purpose computing system and specialized software (such as a mobile device or network appliance executing service software), or other computing configurations. In addition, one or more functionalities disclosed herein may be generated by the processor 802 and a user may interact with a Graphical User Interface (GUI) using one or more user-interface devices (e.g., the keyboard 816, the display unit 818, and the user devices 804) with some of the data in use directly coming from online sources and data stores. The system set forth in FIG. 8 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
    a memory; and
    at least one processor to:
        monitor for a condition associated with a first cloud computing resource performing a cloud computing operation;
        determine that the condition associated with the first cloud computing resource has occurred, the condition comprising one of a change in operational metadata and operational behavior of the cloud computing operation;
        analyze the condition associated with the first cloud computing resource and compare the first cloud computing resource with an on-premise computing resource that is capable of performing at least a subset of the cloud computing operation and with a second cloud computing resource that is capable of performing at least a subset of the cloud computing operation;
        automatically modify the cloud computing operation that uses the first cloud computing resource to use a combination of the on-premise computing resource, the first cloud computing resource, and the second cloud computing resource; and
        send at least one notification to a computing device about the condition associated with the first cloud computing resource and information associated with a modification of the cloud computing operation from the first cloud computing resource to the combination of the on-premise computing resource, the first cloud computing resource, and the second cloud computing resource.

2. The system of claim 1, wherein the cloud computing operation comprises one of a data protection operation, a data backup operation, data replication, and backup of on-premise data.

3. The system of claim 1, wherein the first cloud computing resource comprises one of compute resources, network resources, storage resources, an operating system, application software, data ingress services, and data egress services.

4. The system of claim 1, wherein the condition is associated with one of usage of the first cloud computing resource during a particular period of time, availability of the first cloud computing resource during the particular period of time, performance of the first cloud computing resource during the particular period of time, data ingress for the first cloud computing resource during the particular period of time, data egress for the first cloud computing resource during the particular period of time, a cyber-attack on the first cloud computing resource during the particular period of time, cloud resource health indication information for the first cloud computing resource during the particular period of time, and financial information for the first cloud computing resource during the particular period of time.

5. The system of claim 1, the at least one processor further to compare the first cloud computing resource with a cloud policy to determine that the condition has occurred.

6. The system of claim 1, the at least one processor further to remediate the condition and initiate at least one of an immediate backup of data, replication of data, and migration of data for on-premise data associated with the cloud computing operation.

7. The system of claim 1, wherein the on-premise computing resource has at least one of a shorter operation execution time for the cloud computing operation than the first cloud computing resource, a faster data operation transfer rate for the cloud computing operation than the first cloud computing resource, a lower operation failure rate for the cloud computing operation than the first cloud computing resource, and a lower financial cost for the cloud computing operation than the first cloud computing resource.

8. The system of claim 1, wherein the at least one processor is to automatically modify the cloud computing operation that uses the first cloud computing resource to use a combination of the on-premise computing resource and the first cloud computing resource.

9. The system of claim 1, wherein the at least one processor is to:
    analyze the condition associated with the first cloud computing resource and compare the first cloud computing resource with a second cloud computing resource that is capable of performing at least a subset of the cloud computing operation; and
    automatically modify the cloud computing operation that uses the first cloud computing resource to use a combination of the on-premise computing resource and the second cloud computing resource.

10. A method comprising:
    monitoring, by at least one processor, for a condition associated with an environment of an enterprise, the enterprise using a first cloud computing resource to perform a cloud computing operation;
    determining, by the at least one processor, that the condition associated with the enterprise's environment has occurred, the condition comprising at least one of a change in health, capacity, or performance of one or more on-premise computing resources of the enterprise, a change in service-level requirements of the enterprise, a change in a security alert level of the enterprise, or a change in a data locality rule of the enterprise;

analyzing, by the at least one processor, the condition associated with the first cloud computing resource and comparing the first cloud computing resource with a second cloud computing resource that is capable of performing at least a subset of the cloud computing operation and with an on-premise computing resource of the enterprise that is capable of performing at least a subset of the cloud computing operation;

automatically modifying, by the at least one processor, the cloud computing operation that uses the first cloud computing resource to use a combination of the first cloud computing resource, the second cloud computing resource, and the on-premise computing resource; and sending, by the at least one processor, at least one notification to a computing device about the condition associated with the first cloud computing resource and information associated with a modification of the cloud computing operation from the first cloud computing resource to the combination of the first cloud computing resource, the second cloud computing resource, and the on-premise computing resource.

11. The method of claim 10, wherein the cloud computing operation comprises one of a data protection operation, a data backup operation, data replication, and backup of on-premise data.

12. The method of claim 10, wherein the first cloud computing resource comprises one of compute resources, network resources, storage resources, an operating system, application software, data ingress services, and data egress services.

13. The method of claim 10, wherein the condition is associated with one of usage of the first cloud computing resource during a particular period of time, availability of the first cloud computing resource during the particular period of time, performance of the first cloud computing resource during the particular period of time, data ingress for the first cloud computing resource during the particular period of time, data egress for the first cloud computing resource during the particular period of time, a cyber-attack on the first cloud computing resource during the particular period of time, cloud resource health indication information for the first cloud computing resource during the particular period of time, and financial information for the first cloud computing resource during the particular period of time.

14. The method of claim 10, further comprising comparing the first cloud computing resource with a cloud policy to determine that the condition has occurred.

15. The method of claim 10, further comprising remediating the condition and initiating at least one of an immediate backup of data, replication of data, and migration of data for on-premise data associated with the cloud computing operation.

16. The method of claim 10, wherein at least one of the second cloud computing resource or the on-premise computing resource has at least one of a shorter operation execution time for the cloud computing operation than the first cloud computing resource, a faster data operation transfer rate for the cloud computing operation than the first cloud computing resource, a lower operation failure rate for the cloud computing operation than the first cloud computing resource, and a lower financial cost for the cloud computing operation than the first cloud computing resource.

17. The method of claim 10, wherein the change in the security alert level is in response to at least one of a fire, a security breach, a power outage, a business audit, or a weather condition.

18. A non-transitory computer-readable storage medium, having instructions stored thereon that, when executed by a computing device cause the computing device to perform operations, the operations comprising:

monitoring for a condition associated with an environment of an enterprise, the enterprise using a first cloud computing resource to perform a cloud computing operation;

determining that the condition associated with the enterprise's environment has occurred, the condition comprising at least one of a change in health, capacity, or performance of one or more on-premise computing resources of the enterprise, a change in service-level requirements of the enterprise, a change in a security level alert of the enterprise, or a change in a data locality rule of the enterprise requiring that particular data remain within particular governmental or geographical boundaries;

analyzing the condition associated with the first cloud computing resource and comparing the first cloud computing resource with a second cloud computing resource that is capable of performing at least a subset of the cloud computing operation and with an on-premise computing resource of the enterprise that is capable of performing at least a subset of the cloud computing operation;

automatically modifying the cloud computing operation that uses the first cloud computing resource to use a combination of the first cloud computing resource, the second cloud computing resource, and the on-premise computing resource; and sending at least one notification to a computing device about the condition associated with the first cloud computing resource and information associated with a modification of the cloud computing operation from the first cloud computing resource to the combination of the first cloud computing resource, the second cloud computing resource, and the on-premise computing resource.

19. The non-transitory computer-readable storage medium of claim 18, wherein the cloud computing operation comprises one of a data protection operation, a data backup operation, data replication, and backup of on-premise data.

20. The non-transitory computer-readable storage medium of claim 18, wherein the first cloud computing resource comprises one of compute resources, network resources, storage resources, an operating system, application software, data ingress services, and data egress services.

21. The non-transitory computer-readable storage medium of claim 18, wherein the condition is associated with one of usage of the first cloud computing resource during a particular period of time, availability of the first cloud computing resource during the particular period of time, performance of the first cloud computing resource during the particular period of time, data ingress for the first cloud computing resource during the particular period of time, data egress for the first cloud computing resource during the particular period of time, a cyber-attack on the first cloud computing resource during the particular period of time, cloud resource health indication information for the first cloud computing resource during the particular period of time, and financial information for the first cloud computing resource during the particular period of time.

22. The non-transitory computer-readable storage medium of claim 18, the operations further comprising comparing the first cloud computing resource with a cloud policy to determine that the condition has occurred.

23. The non-transitory computer-readable storage medium of claim 18, the operations further comprising remediating the condition and initiating at least one of an immediate backup of data, replication of data, and migration of data for on-premise data associated with the cloud computing operation.

24. The non-transitory computer-readable storage medium of claim 18, wherein at least one of the second cloud computing resource or the on-premise computing resource has at least one of a shorter operation execution time for the cloud computing operation than the first cloud computing resource, a faster data operation transfer rate for the cloud computing operation than the first cloud computing resource, a lower operation failure rate for the cloud computing operation than the first cloud computing resource, and a lower financial cost for the cloud computing operation than the first cloud computing resource.

\* \* \* \* \*